(12) United States Patent
Pelegri

(10) Patent No.: US 7,652,478 B2
(45) Date of Patent: *Jan. 26, 2010

(54) CROSS-COMPONENT ALIGNMENT MEASUREMENT AND CALIBRATION

(75) Inventor: Luis M. Pelegri, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/621,282

(22) Filed: Jan. 9, 2007

(65) Prior Publication Data

US 2007/0103160 A1    May 10, 2007

Related U.S. Application Data

(63) Continuation-in-part of application No. 10/841,397, filed on May 7, 2004, now Pat. No. 7,199,586.

(51) Int. Cl.
*G01B 3/08* (2006.01)
(52) U.S. Cl. .................................. 324/338; 324/339
(58) Field of Classification Search ............. 324/207.2, 324/207.25, 174, 173, 207.16, 207.15, 338–346; 702/6, 7, 9
See application file for complete search history.

(56) References Cited

U.S. PATENT DOCUMENTS

| | | | |
|---|---|---|---|
| 3,094,658 A | 6/1963 | Bravenec et al. |
| 3,124,742 A | 3/1964 | Schneider |
| 3,340,464 A | 9/1967 | Gouilloud |
| 3,808,520 A | 4/1974 | Runge |
| 3,890,563 A | 6/1975 | Dowling et al. |
| 3,996,518 A | 12/1976 | Halstead et al. |
| 4,302,722 A | 11/1981 | Gianzero |
| 4,367,647 A | 1/1983 | Barnoud et al. |
| 4,416,494 A | 11/1983 | Watkins et al. |
| 4,471,436 A | 9/1984 | Schaefer et al. |
| 4,514,693 A | 4/1985 | Meador |
| 4,651,101 A | 3/1987 | Barber et al. |
| 4,808,929 A | 2/1989 | Oldigs |
| 4,857,852 A | 8/1989 | Kleinberg |
| 5,065,099 A | 11/1991 | Sinclair et al. |
| 5,293,128 A | 3/1994 | Zhou |
| 5,343,001 A | 8/1994 | Cowles et al. |
| 5,452,761 A | 9/1995 | Beard et al. |
| 5,708,204 A | 1/1998 | Kasap |
| 5,781,436 A | 7/1998 | Forgang et al. |
| 5,789,995 A | 8/1998 | Minasi |
| 5,811,972 A | 9/1998 | Thompson et al. |
| 5,869,968 A | 2/1999 | Brooks et al. |
| 5,883,515 A | 3/1999 | Strack et al. |
| 5,999,883 A | 12/1999 | Gupta et al. |

(Continued)

FOREIGN PATENT DOCUMENTS

EP    02894180 B1    9/1993

(Continued)

OTHER PUBLICATIONS

Zhou et al.; "Reservoir Monitoring With Interwell Electromagnetic Imaging," Chevron Petroleum Technology Company, (date: unknown), pp. 1-10.

(Continued)

*Primary Examiner*—Reena Aurora
(74) *Attorney, Agent, or Firm*—Madan & Sriram, P.C.

(57) ABSTRACT

A multicomponent induction logging tool is positioned within an alignment loop and the transmitter is activated at a number of rotation angles of the tool. Misalignment between the transmitter and receiver coils can be determined from the induced signals in the receiver coil.

8 Claims, 9 Drawing Sheets

U.S. PATENT DOCUMENTS

| | | | |
|---|---|---|---|
| 6,064,210 A | 5/2000 | Sinclair | |
| 6,150,954 A | 11/2000 | Smith | |
| 6,311,045 B1 | 10/2001 | Domokos | |
| 6,487,395 B1 | 11/2002 | Durec et al. | |
| 6,734,675 B2 | 5/2004 | Fanini et al. | |
| 7,268,555 B1 * | 9/2007 | Rabinovich et al. | 324/338 |
| 2002/0101242 A1 | 8/2002 | Bittar | |
| 2002/0105332 A1 | 8/2002 | Rosthal et al. | 324/338 |
| 2003/0146753 A1 | 8/2003 | Rosthal et al. | 324/346 |
| 2003/0184304 A1 | 10/2003 | Homan et al. | 324/343 |
| 2004/0017197 A1 | 1/2004 | Chen et al. | 324/339 |
| 2004/0046560 A1 | 3/2004 | Itskovich et al. | |
| 2004/0056663 A1 | 3/2004 | Sinclair et al. | |
| 2004/0113609 A1 | 6/2004 | Homan et al. | |
| 2004/0140809 A1 | 7/2004 | Mercer | |
| 2004/0217763 A1 | 11/2004 | Moore | |
| 2005/0088180 A1 | 4/2005 | Flanagan | |
| 2005/0143920 A1 | 6/2005 | Barber et al. | |
| 2005/0153664 A1 | 7/2005 | Moloudi et al. | 455/78 |
| 2005/0256644 A1 | 11/2005 | Xiao | |
| 2006/0043973 A1 | 3/2006 | Chen et al. | 324/339 |
| 2006/0103389 A1 | 5/2006 | Bespalov et al. | |
| 2006/0125479 A1 | 6/2006 | Chemali et al. | 324/339 |
| 2006/0135083 A1 | 6/2006 | Leinonen et al. | |
| 2006/0154617 A1 | 7/2006 | Clingman et al. | 455/78 |
| 2006/0178165 A1 | 8/2006 | Vassiliou et al. | 455/552.1 |
| 2006/0208737 A1 | 9/2006 | Merchant et al. | 324/330 |
| 2006/0214664 A1 | 9/2006 | Folberth et al. | 324/339 |
| 2006/0286940 A1 | 12/2006 | Izumi et al. | 455/78 |
| 2007/0049213 A1 | 3/2007 | Tran | 455/78 |
| 2007/0117522 A1 | 5/2007 | Axness et al. | 455/78 |
| 2007/0149145 A1 | 6/2007 | Chang et al. | 455/78 |
| 2007/0170923 A1 | 7/2007 | Forgang et al. | 324/339 |

FOREIGN PATENT DOCUMENTS

WO    WO98/00733    1/1998

OTHER PUBLICATIONS

Zhou et al.; A Review of Interwell Electromagnetic Methods for Reservoir Characterization (date: unknown), pp. 1-8.

Maher et al., "The Transverse Induction Logging Tool (TILT) Provides Enhanced Evaluation Results in the Cognac Field, Gulf of Mexico", May 1999, pp. 1-8.

J.H. Moran & K.S. Kunz, "Basic Theory of Induction Logging and Application to Study of Two-Coil Sondes", Geophysics, vol. 27, No. 6, Part 1, Dec. 1962, Society of Exploration Geophysicists pp. 829-858.

L.A. Tabarovski et al.; "Radial Characteristics of Induction Focusing Probes with Transverswe Detectors in an Anisotropic Medium", Nauka, Soviet Geology and Geophysics, vol. 20, No. 7, 1979, pp. 81-90.

Wilt et al.; "Electromagnetic Methods for Development and Production: State of the Art," The Leading Edge, Apr. 1998, pp. 487-491.

* cited by examiner

CROSS-COMPONENT ALIGNMENT MEASUREMENT AND CALIBRATION

CROSS REFERENCE TO RELATED APPLICATIONS

The present invention is a continuation-in-part of U.S. patent application Ser. No. 10/841,397 filed on May 7, 2004 and a continuation-in-part of U.S. patent application Ser. No. 11/340,785 filed on 26 Jan. 2006.

BACKGROUND OF THE INVENTION

1. Field of the Invention

The present invention is related to the field of apparatus design in the field of oil exploration. In particular, the present invention describes a method for calibrating multicomponent logging devices used for detecting the presence of oil in boreholes penetrating a geological formation.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

The conventional geophysical induction resistivity well logging tool is a probe suitable for lowering into the borehole and it comprises a sensor section containing a transmitter and receiver and other, primarily electrical, equipment for measuring data to infer the physical parameters that characterize the formation. The sensor section, or mandrel, comprises induction transmitters and receivers positioned along the instrument axis, arranged in the order according to particular instrument or tool specifications and oriented parallel with the borehole axis. The electrical equipment generates an electrical voltage to be further applied to a transmitter induction coil, conditions signals coming from receiver induction coils, processes the acquired information, stores or by means of telemetry sending the data to the earth surface through a wire line cable used to lower the tool into the borehole.

In general, when using a conventional induction logging tool with transmitters and receivers (induction coils) oriented only along the borehole axis, the hydrocarbon-bearing zones are difficult to detect when they occur in multi-layered or laminated reservoirs. These reservoirs usually consist of thin alternating layers of shale and sand and, oftentimes, the layers are so thin that due to the insufficient resolution of the conventional logging tool they cannot be detected individually. In this case the average conductivity of the formation is evaluated.

Conventional induction well logging techniques employ coils wound on an insulating mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In conventional induction logging apparatus, the basic transmitter coil and receiver coil has axes which are aligned with the longitudinal axis of the well logging device. (For simplicity of explanation, it will be assumed that the bore hole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the bore hole, and the vertical resistivity in the direction parallel to the bore hole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722 to Gianzero et al. Transverse anisotropy often occurs such that variations in resistivity occur in the azimuthal direction.

Thus, in a vertical borehole, a conventional induction logging tool with transmitters and receivers (induction coils) oriented only along the borehole axis responds to the average horizontal conductivity that combines the conductivity of both sand and shale. These average readings are usually dominated by the relatively higher conductivity of the shale layers and exhibit reduced sensitivity to the lower conductivity sand layers where hydrocarbon reserves are produced. To address this problem, loggers have turned to using transverse induction logging tools having magnetic transmitters and receivers (induction coils) oriented transversely with respect to the tool longitudinal axis. Such instruments for transverse induction well logging has been described in PCT Patent publication WO 98/00733 of Beard et al. and U.S. Pat. No. 5,452,761 to Beard et al.; U.S. Pat. No. 5,999,883 to Gupta et al.; and U.S. Pat. No. 5,781,436 to Forgang et al.

In the transverse induction logging tools the response of transversal coil arrays is also determined by an average conductivity, however, the relatively lower conductivity of hydrocarbon-bearing sand layers dominates in this estimation. In general, the volume of shale/sand in the formation can be determined from gamma-ray or nuclear well logging measurements. Then a combination of the conventional induction logging tool with transmitters and receivers oriented along the well axis and the transversal induction logging tool can be used for determining the conductivity of individual shale and sand layers.

One, if not the main, difficulties in interpreting the data acquired by a transversal induction logging tool is associated with vulnerability of its response to borehole conditions. Among these conditions is the presence of a conductive well fluid as well as wellbore fluid invasion effects In the induction logging instruments the acquired data quality depends on the formation electromagnetic parameter distribution (conductivity) in which the tool induction receivers operate. Thus, in the ideal case, the logging tool measures magnetic signals induced by eddy currents flowing in the formation. Variations in the magnitude and phase of the eddy currents occurring in response to variations in the formation conductivity are reflected as respective variations in the output voltage of receivers. In the conventional induction instruments these receiver induction coil voltages are conditioned and then processed using analog phase sensitive detectors or digitized by digital to analog converters and then processed with signal processing algorithms. The processing allows for determining both receiver voltage amplitude and phase with respect to the induction transmitter current or magnetic field waveform. It has been found convenient for further uphole geophysical interpretation to deliver the processed receiver signal as a vector combination of two voltage components: one being in-phase with transmitter waveform and another out-of-phase, quadrature component. Theoretically, the in-phase coil voltage component amplitude is the more sensitive and noise-free indicator of the formation conductivity.

There are various hardware margins and software limitations that impact a conventional transversal induction logging tool performance and result in errors appearing in the acquired data.

The general hardware problem is typically associated with an unavoidable electrical field that is irradiated by the tool induction transmitter simultaneously with the desirable magnetic field, and it happens in agreement with Maxwell's equations for the time varying field. The transmitter electrical field interacts with remaining modules of the induction logging tool and with the formation; however, this interaction does not produce any useful information. Indeed, due to the always-existing possibility for this field to be coupled directly into the receiver part of the sensor section through parasitic displacement currents, it introduces the noise. When this coupling occurs, the electrical field develops undesirable electrical potentials at the input of the receiver signal conditioning, primarily across the induction coil receiver, and this voltage becomes an additive noise component to the signal of interest introducing a systematic error to the measurements.

The problem could become even more severe if the induction logging tool operates in wells containing water-based fluids. The water-based mud has a significantly higher electrical permittivity compared to the air or to the oil-based fluid. In the same time, the electrical impedance to the above mentioned displacement currents can be always considered as capacitive coupling between the source—the induction transmitter and the point of coupling. This circumstance apparently would result in a fact that capacitive coupling and associated systematic errors are environment dependant because capacitive impedance will be converse to the well mud permittivity.

The conventional method in reducing this capacitive coupling in the induction logging instrument lays in using special electrical (Faraday) shields wrapped around both transmitter and receiver induction coils. These shields are electrically attached to the transmitter analog ground common point to fix their own electrical potential and to provide returns of the displacement currents back to their source-transmitter instead of coupling to any other place in the tool. However, geometry and layout effectiveness of Faraday shields becomes marginal and contradictory in the high frequency applications where conventional transverse induction tools can operate. These limitations occur due to the attenuation these shields introduce to the magnetic field known in the art as a shield "skin effect". The shield design limitations are unavoidable and, therefore, the possibility for the coupling through displacement currents remains.

Another source of hardware errors introduced into the acquired log data is associated electrical potential difference between different tool conductive parts and, in particular, between transmitter and receiver pressure housings if these modules are spaced apart or galvanically separated. These housings cover respective electronic modules and protect them from exposure to the harsh well environment including high pressure and drilling fluids. Typically, the pressure housing has a solid electrical connection to the common point of the electronic module it covers, however, design options with "galvanically" floating housings also exist. If for some reasons, mainly imperfections in conventional induction tools, the common points of different electronic modules have an electrical potential difference between them, this difference will appear on the pressure housings. It may occur even in a design with "galvanically" floating housings if the instrument operates at the high frequencies and, in particular, through the capacitive coupling that these metal parts might have to the electronic modules encapsulated in a conductive metallic package.

Having different electrical potentials on separate pressure housings will force the electrical current to flow between them. This current would have a conductive nature and high magnitude if the induction tool is immersed in a conductive well fluid and it will be a displacement current of typically much less magnitude for tool operations in a less conductive or oil-based mud. In both cases this current is time-varying; therefore it produces an associated time varying magnetic field that is environmentally dependent and measured by the induction receiver. For those who are skilled in the art it should be understood that the undesirable influence of those currents on the log data would be significantly higher in the conventional transverse induction tool compared to the instruments having induction coils coaxial with the tool longitudinal axis only. In particular, this is due to the commonly accepted overall design geometry of induction logging tools where transmitter and receiver sections are axially separated by the mandrel. It can be noticed that employing the induction tool in the logging string where it has mechanical and electrical connections (including telemetry) with instruments positioned both above and below could also result in the appearance of the above-mentioned currents.

Another source of the housings' potential offsets is the induction tool transmitter itself. The remaining electrical field that this transmitter irradiates simultaneously with a magnetic field could be different on the surface of separate pressure housings. Severity of this error also depends on Faraday shields' imperfections as described earlier.

There is an additional problem that the potential difference creates in conventional tool layouts having transmitter and receiver electronic modules spaced apart and using interconnection wires running throughout the sensor (mandrel) section. These wires should be electrically and magnetically shielded from induction receiver coils in the sensor section. The entire bundle of wires is placed inside of a highly conductive metal shield that is electrically connected to the common points of separated transmitter and receiver electronic modules. This shield's thickness is selected to enable sufficient suppression of mutual crosstalk between wires and sensor section coils within the entire operational frequency bandwidth and, primarily, at its lower end. In some cases, this shield is a hollow copper pipe with a relatively thick wall.

However, besides protecting the sensor section transmitter and receiver coils and interconnecting wires from mutual crosstalk, this shield simultaneously creates a galvanic path for the currents that could be driven by pressure housings and/or electronic potential difference. This path apparently exists along the shield's external surface. The time varying currents also generate a respective magnetic field that crosses induction receiver coils and induces error voltages. Unfortunately, these error voltages are also environmentally dependent and their changes cannot be sufficiently calibrated out during tool manufacturing. The overall analysis of the potential difference influence demonstrates that in the conductive well fluid, galvanic currents flowing through the fluid along external surface of the induction tool would dominate and, decreasing fluid conductivity redirects these currents to flow along the internal connection between housings. The superposition and magnitude of these galvanic currents strongly depend up on the ambient temperature that pushes the conventional induction tool performance to further deterioration.

Another source of systematic errors introduced in the log data is directly determined by uncertainties in mechanical dimensions of multi-component transmitter and receiver coils in the sensor section related both to their overall dimensions and positions with respect to each other. Thus, to keep required signal phase relationships, conventional tool designs have relied on the mechanical stability and electrical properties of advanced ceramics and plastic materials to build the mandrel. However, even slight physical assembly deviations in the coil wires position and non-uniform coil form material temperature dependencies might destroy a factory pre-set bucking (compensation of the transmitter primary magnetic field coupled in the receiver coil) during well logging, and create non-recoverable errors due to mechanical displacement or imperfections.

U.S. Pat. No. 6,734,675 and U.S. Pat. No. 6,586,939 to Fanini et al., both having the same assignee as the present application and the contents of which are incorporated herein by reference, address some of the issues present in the calibration and use of multicomponent induction logging tools. Fanini '939 discloses a transverse induction logging tool having a transmitter and receiver for downhole sampling of formation properties, the tool having a symmetrical shielded split-coil transmitter coil and a bucking coil interposed between the split transmitter coils to reduce coupling of the transmitter time varying magnetic field into the receiver. The tool provides symmetrical shielding of the coils and grounding at either the transmitter or receiver end only to reduce coupling of induced currents into the received signal. The tool provides an insulator between receiver electronics and the conductive receiver housing having contact with conductive wellbore fluid, to reduce parasitic current flowing in a loop formed by the upper housing, feed through pipe, lower housing and wellbore fluid adjacent the probe housing or mandrel. An internal verification loop is provided to track changes in transmitter current in the real and quadrature component of the received data signal.

Fanini '675 discloses a transverse induction logging tool having a transmitter and receiver for downhole sampling of formation properties, the tool having a symmetrical shielded split-coil transmitter coil and a bucking coil interposed between the split transmitter coils to reduce coupling of the transmitter time varying magnetic field into the receiver. The tool provides symmetrical shielding of the coils and grounding at either the transmitter or receiver end only to reduce coupling of induced currents into the received signal. The tool provides an insulator between receiver electronics and the conductive receiver housing having contact with conductive wellbore fluid, to reduce parasitic current flowing in a loop formed by the upper housing, feed through pipe, lower housing and wellbore fluid adjacent the probe housing or mandrel. An internal verification loop is provided to track changes in transmitter current in the real and quadrature component of the received data signal

SUMMARY OF THE INVENTION

One embodiment of the invention cemented of preparing a logging tool having a plurality of antennas. The antennas are positioned within a magnetic field. The antennas are then rotated relative to the magnetic field. A transmitter antenna is activated at a plurality of rotational positions. An induced signal is received in a receiver antenna at the plurality of rotational positions. The angle between the transmitter antenna and the receiver antenna is estimated from the induced signals. A substantially planar alignment loop may be used to provide the magnetic field. Determining the angle may be based on estimating a rotational position at which the signal is substantially zero. The method may further include correcting an alignment of the transmitter antenna and/or does receive an antenna using the estimated angle.

Another embodiment of the invention is a computer-readable-medium for use with an apparatus which evaluates a logging tool having a plurality of antennas. The apparatus includes a source of a magnetic field. The medium includes instructions which enable a processor to determine an angle between a transmitter antenna and a receiver antenna from signals resulting from excitation of the transmitter antenna at a plurality of rotational angles of the logging tool. The medium may further include a ROM, an EPROM, an EPROM, a flash memory, and/or an optical disk.

BRIEF DESCRIPTION OF THE DRAWINGS

The present invention is best understood with reference to the accompanying figures in which like numerals refer to like elements and in which.

DETAILED DESCRIPTION OF THE INVENTION

The instrument structure provided by the present invention enables increased stability and accuracy in an induction wellbore logging tool and its operational capabilities, which, in turn, results in better quality and utility of wellbore data acquired during logging. The features of the present invention are applicable to improve the structure of a majority of known induction tools.

Figure 1:
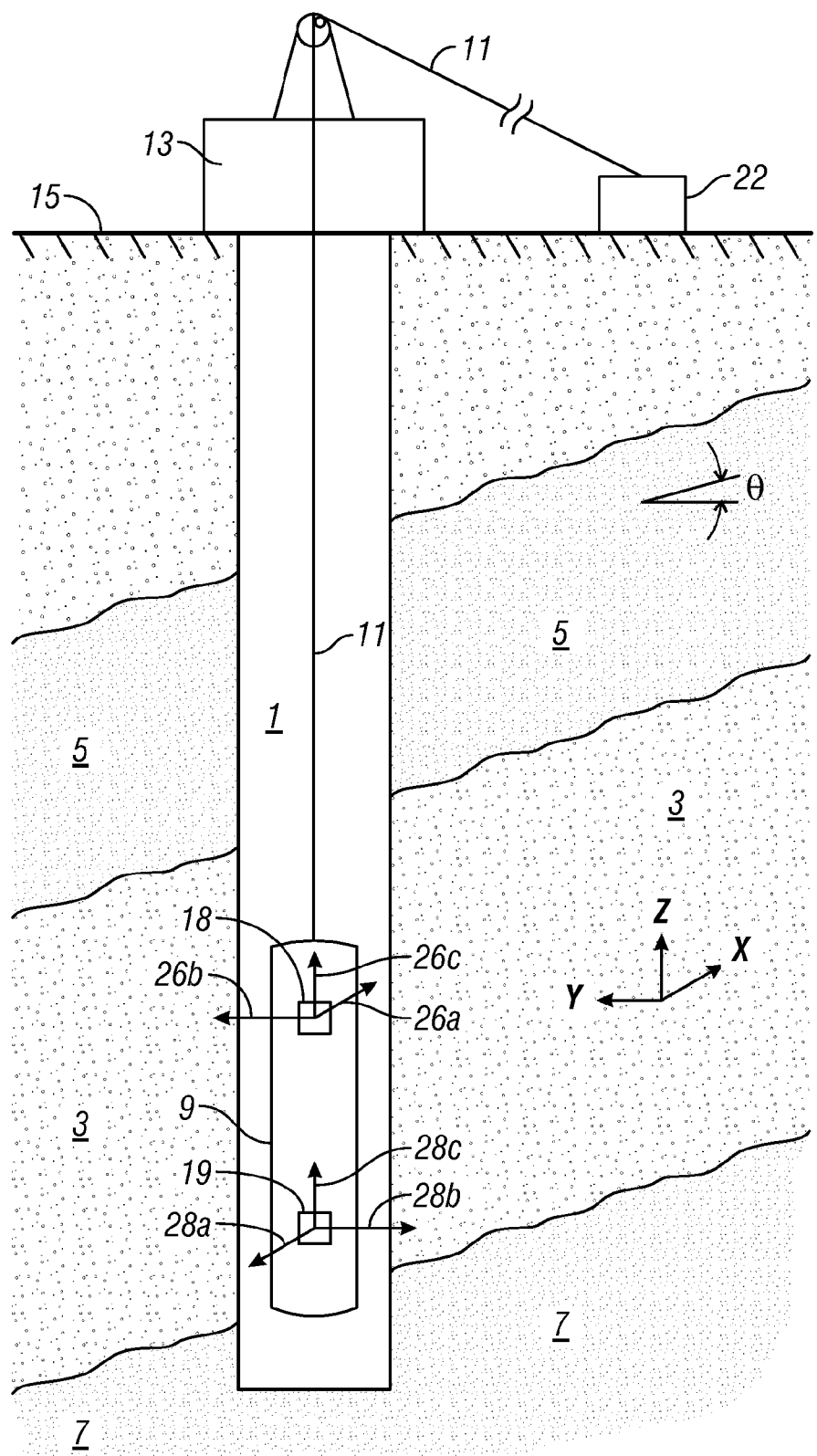
FIG. 1 (prior art) shows schematically a wellbore extending into a laminated earth formation, into which wellbore an induction logging tool as used according to the invention has been lowered.

The invention will now be described in more detail and by way of example with reference to the accompanying drawings. FIG. 1 schematically shows a wellbore 1 extending into a laminated earth formation, into which wellbore an induction logging tool as used according to the present invention has been lowered. The wellbore in FIG. 1 extends into an earth formation which includes a hydrocarbon-bearing sand layer 3 located between an upper shale layer 5 and a higher conductivity than the hydrocarbon bearing sand layer 3. An induction logging tool 9 used in the practice of the invention has been lowered into the wellbore 1 via a wire line 11 extending through a blowout preventor 13 (shown schematically) located at the earth surface 15. The surface equipment 22 includes an electric power supply to provide electric power to the set of coils 18 and a signal processor to receive and process electric signals from the receiver coils 19. Alternatively, the power supply and/or signal processors are located in the logging tool.

The relative orientation of the wellbore 1 and the logging tool 9 with respect to the layers 3, 5, 7 is determined by two angles, one of which θ as shown in the FIG. 1. For determination of these angles see, for example, U.S. Pat. No. 5,999,883 to Gupta, et al. The logging tool 9 is provided with a set of transmitter coils 18 and a set of receiver coils 19, each set of coils 18, 19 being connected to surface equipment 22 via suitable conductors (not shown) extending along the wire line 11.

Each set of coils 18 and 19 includes three coils (not shown), which are arranged such that the set has three magnetic dipole moments in mutually orthogonal directions, that is, in x, y and z directions. The three-coil transmitter coil set transmits $T_x$, $T_y$ and $T_z$. The receiver coil receives $R_x$, $R_y$ and $R_z$ plus the cross components, $R_{xy}$, $R_{xz}$ and $R_{zy}$. Thus, coil set 18 has magnetic dipole moments 26a, 26b, 26c, and coil set 19 has magnetic dipole moments 28a, 28b, 28c. In one embodiment the transmitter coil set 18 is electrically isolated from the receiver coil set 19. In an alternative embodiment, each coil in transmitter coil set 18 electrically isolated from each other and each coil in receiver coil set 19 electrically isolated from each other. The coils with magnetic dipole moments 26a and 28a are transverse coils, that is they are oriented so that the magnetic dipole moments are oriented perpendicular to the wellbore axis, whereby the direction of magnetic dipole moment 28a is opposite to the direction of magnetic dipole moment 26a. Furthermore the sets of coils 18 and 19 are positioned substantially along the longitudinal axis of the logging tool 9.

Figure 2:
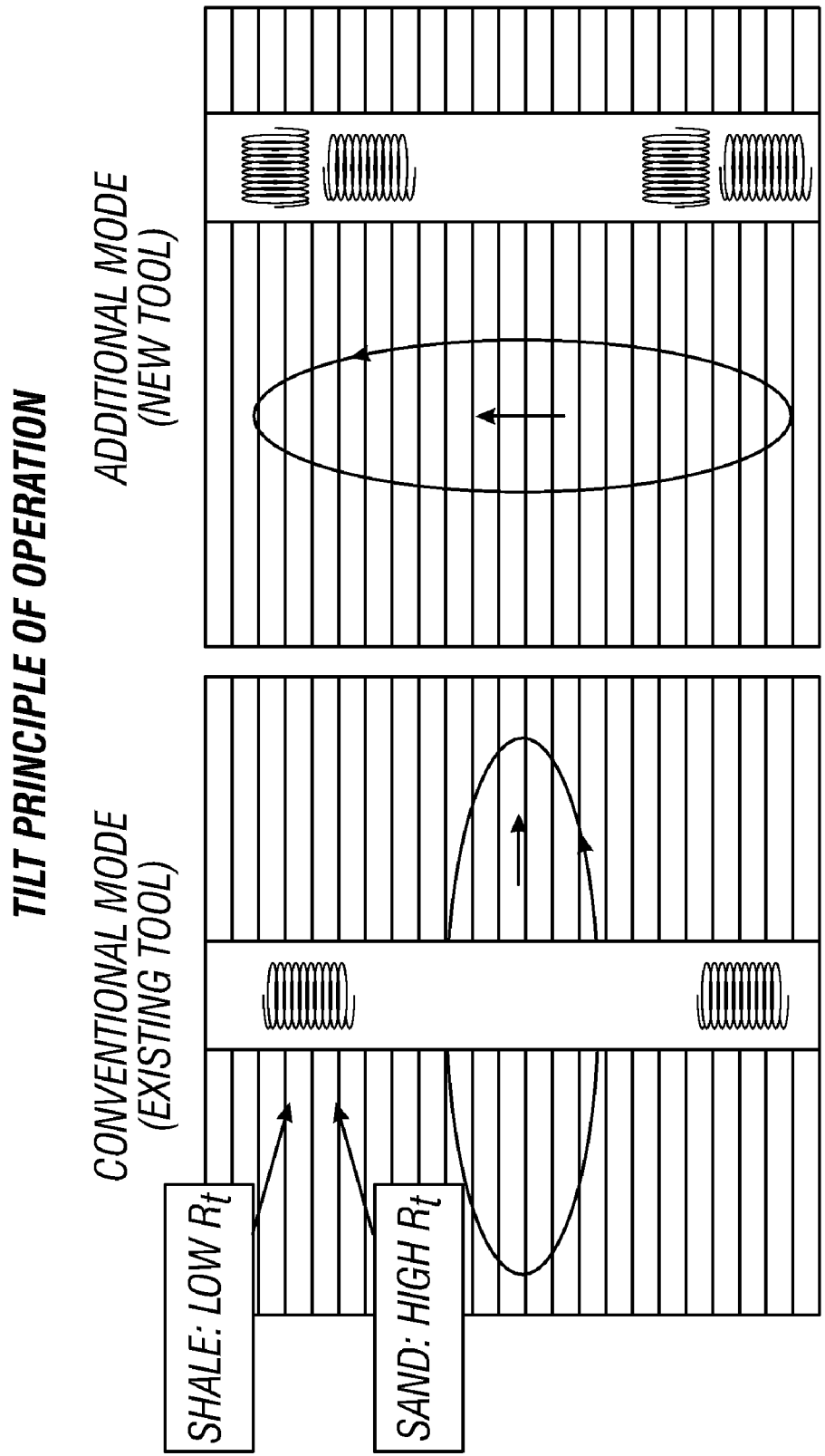
FIG. 2A (prior art) illustrates a conventional resistivity measurement in the vertical direction.
FIG. 2B (prior art) illustrates a resistivity measurement in the horizontal direction.

As shown in FIG. 2A, conventional induction logging tools provide a single transmitter and receiver coil that measure resistivity in the horizontal direction. In the conventional horizontal mode, as shown in FIG. 2A, the resistivities of adjacent high resistivity sand and low resistivity shale layers appear in parallel, thus the resistivity measurement is dominated by low resistivity shale. As shown in FIGS. 1 and 2B, in the present invention a transverse coil is added to measure resistivity in the vertical direction. In the vertical direction, the resistivity of the highly resistive sand and low resistivity shale are appear in series and thus the vertical series resistivity measurement is dominated by the resistivity of the highly resistive sand.

For ease of reference, normal operation of the tool 9, as shown in FIGS. 1 and 2B, will be described hereinafter only for the coils having dipole moments in the x-direction, i.e. dipole moments 26a and 28a. During normal operation an alternating current of a frequency $f_1$ is supplied by the electric power supply of surface equipment 22 to transmitter coil set 18 so that a magnetic field with magnetic dipole moment 26a is induced in the formation. In an alternative embodiment, the frequency is swept through a range $f_1$ through $f_2$. This magnetic field extends into the sand layer 3 and induces a number of local eddy currents in the sand layer 3. The magnitude of the local eddy currents is dependent upon their location relative to the transmitter coil set 18, the conductivity of the earth formation at each location, and the frequency at which the transmitter coil set 18 is operating. In principle the local eddy currents act as a source inducing new currents, which again induce further new currents, and so on. The currents induced into the sand layer 3 induces a response magnetic field in the formation, which is not in phase with the transmitted magnetic field, but which induces a response current in receiver coil set 19. The magnitude of the current induced in the sand layer 3 depends on the conductivity of the sand layer 3, the magnitude of the response current in receiver coil set 19. The magnitude also depends on the conductivity and thereby provides an indication of the conductivity of the sand layer 3. However, the magnetic field generated by transmitter coil set 18 not only extends into sand layer 3, but also in the wellbore fluid and in the shale layers 5 and 7 so that currents in the wellbore fluid and the shale layers 5 and 7 are induced.

Figure 3:
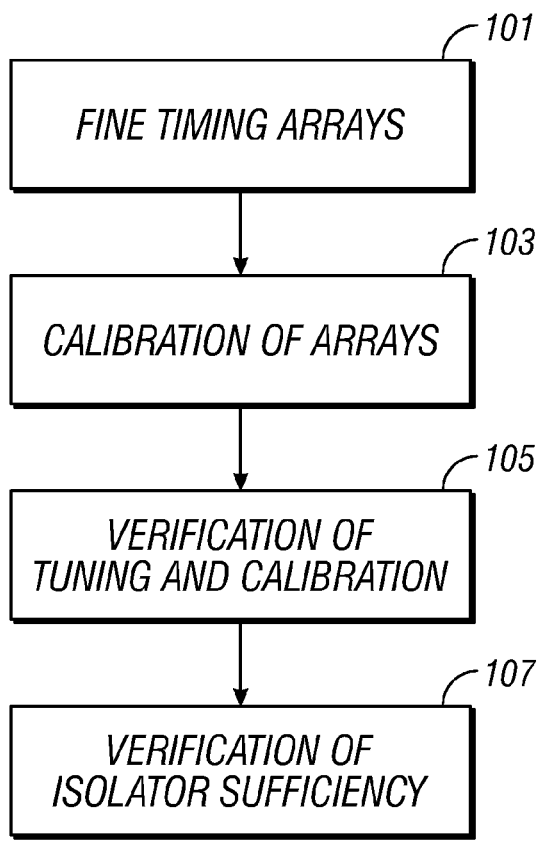
FIG. 3 is an overall flow chart of the procedures of the present invention.

The overall procedures of the present invention used to ensure proper functioning of a deployed multicomponent induction logging tool is summarized in FIG. 3. Calibration the instrument's arrays is done, particularly estimating its transfer coefficient 101. Subsequently, a final verification of the tuning and calibration consistency is performed 103. This is followed by a verification of isolator sufficiency 105 for preventing an axial current flow between the tool's top and bottom housings/electronics through the feed-through pipe and conductors while logging in the boreholes filled with conductive mud.

In further detail, the fully made tool is placed in calibration area which has a small number of external conductive parts that could affect tool readings (machinery, measurement tools, etc.). For example, positioning the tool at approximately 15 ft (4.6 m) above the ground typically reduces the tool reading to a value less than about 10 mS/m. The tool is positioned parallel to the Earth with the array to be adjusted pointing normal to the ground. The instrument's top and bottom housing are interconnected with a borehole conductivity simulator (BCS) and the insulator is shorted.

Figure 4:
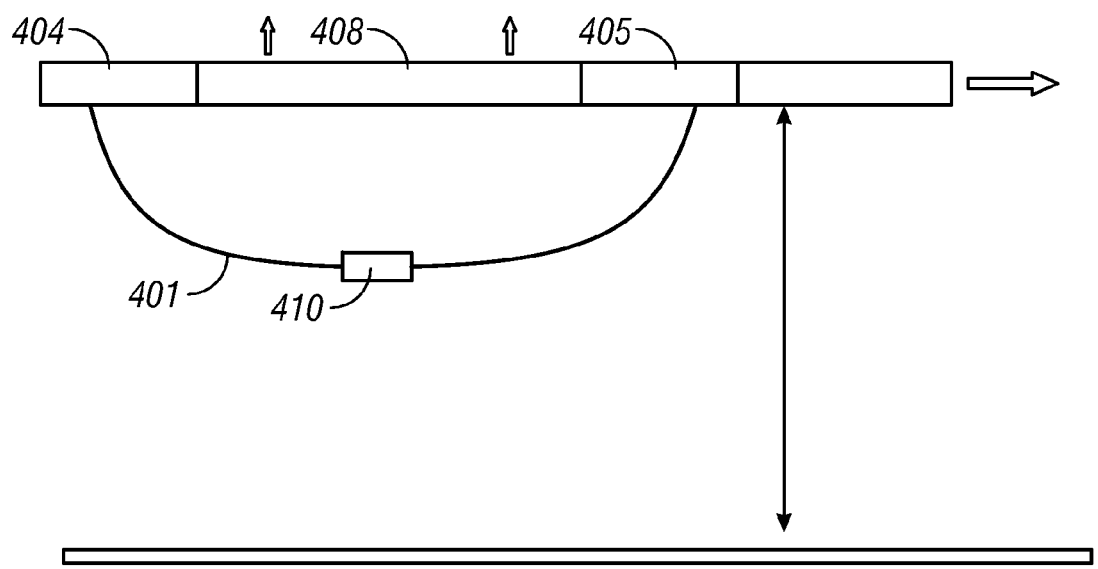
FIG. 4 illustrates a borehole conductivity simulator (BCS) used in the present invention.

FIG. 4 illustrates the BCS, comprising an assembly of conductor 401 and resistor 410, which electrically couples top housing 405 and bottom housing 404. A closed circuit is thus created from bottom housing 404 through resistor 410 through top housing 405 through a feed-through pipe running from bottom housing to top housing through mandrel 408. The value of resistor 410 can be configured to be approximately equal to a total conductance value the tool would experience inside a borehole well according to its specifications. A resistance value of approximately 20 Ohms is typically chosen.

In this arrangement the tool becomes very sensitive to the axial current that could be induced by the array transmitter in the following loop: "top housing—shorted feed-through pipe—bottom housing—BCS". The magnitude of the current will be proportional to the array coils displacement from their longitudinal alignment and simulator resistor value.

To balance the array its transmitter coil may be moved in the plane parallel to the ground. This coil movement is performed until absolute minimum in the array reading is reached. Upon adjustment the transmitter coil frame is fixed inside the mandrel with the sets of non-conductive screws and/or with epoxy. Shorting the isolator between the upper housing and the mandrel is done to significantly increase the magnitude of the axial current in this test procedure and, therefore, increase accuracy of balancing. A similar positioning may be done in the vertical direction. As discussed below, the tool is more sensitive to mispositioning in the vertical direction than in the horizontal direction. Suitable positioning screws may be provided in the logging tool to accomplish this movement.

After the first horizontal array has been tuned the tool is rotated about its axis and similar procedure has been performed with next horizontal array. Generally, the instrument might have a plurality of transverse and tilted arrays so that similar tuning could be developed for each sensor. After balance of all arrays has been completed, the tool isolation short is removed and mandrel is covered with the non-conductive pressure sleeve.

Calibration of transfer coefficient is done after the instrument is positioned in the low conductive calibration environment and inserted inside the calibrator. The calibration principle lies in introducing a certain magnetic load for calibrating array so that its signal readings are identical to the values to be read while logging a homogeneous formation. This is done with use of a calibrator whose electromagnetic parameters and coupling with the tool are precisely known. Using the calibrator, tool loading is achieved by the connecting certain impedance to the terminal of normally-open calibrator loop. Thus, the open loop presents an infinitely resistive formation. Conversely, by shorting, almost infinitely conductive formation is presented. Therefore, any value of the formation conductivity corresponds to its unique value of the calibration loop load.

Acquiring the calibration signal is typically done in the mode "calibration load connected-disconnected". This difference in the tool reading indicates on how much the tool output voltage swings when the formation conductivity changes from 0 to the calibrated value. To perform calibration the tool array may be oriented normal to the ground as this leads to more consistency in measurements and apparently make its transversal arrays less sensitive to any noise currents that maybe circulating on the Earth surface in place of measurement (machinery, radio-stations, etc.).

After the tool transfer coefficient has been determined, the tool readings while the calibrator loop is not loaded reflect environmental conductivity and, in particular, ground conductivity. This data has to be known and stored for further processing.

The last step in calibration is verification of the tool symmetry and immunity to axial currents. The overall tool symmetry assumes that the same array reads the same values of the "ground" or environmental conductivity while its measurement direction points to ground or from the ground. For these purposes the tool is rotated around its longitudinal axis on 180°. Absence of such a "direction sensitivity" would indicate normal tool functioning and ensure respective symmetry while operating in the well bore.

For verification of the suppressing axial currents—a modified BCS test may be with the short removed in the feed-through. Thus, connecting and disconnecting the BCS to the tool should result in absolute minimal difference in readings that would indicate for proper operation in the well without formation-dependable offset in the tool data. This modified BCS test could be run as described, or, to reduce calibration time, performed right after the transfer coefficient is determined.

Figure 5:
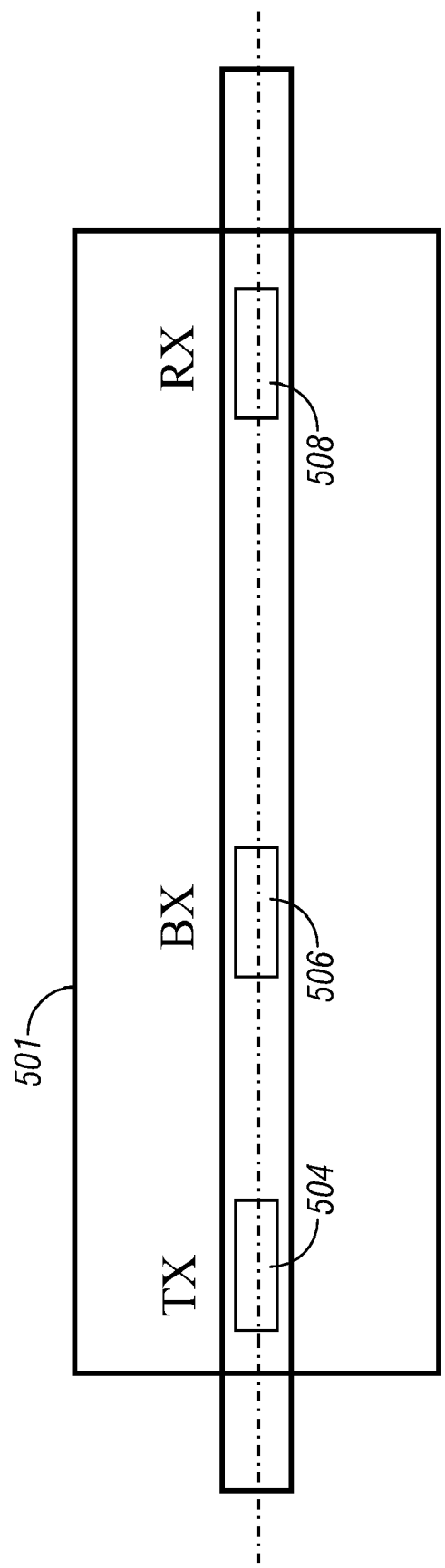
FIG. 5 illustrates an assembly for calibrating of transverse arrays in a logging tool.

Turning now to FIG. 5, one arrangement of the alignment loop is discussed. Shown therein is an alignment loop 501 surrounding an array characterized by the transmitter coil 504 directed along an X direction ($T_x$) and the receiver coil 508 directed along the X direction ($R_x$). Bucking coil $B_x$ 506 is also shown. This array is denoted as XX, using a nomenclature in which the first letter signifies the orientation direction of the transmitter coil and the last letter signifies the orientation direction of the receiver coil. This nomenclature is generally used herein. The XX and YY arrays in the multi-component tool are ideally aligned at 90° from each other. When this alignment is not met, the response of the cross components (XY, YX) are affected by part of the reading of the related main component. The alignment measuring method of the present invention is based on analyzing the output of the cross-component system when the tool is rotated inside of an alignment loop.

The alignment loop 501 is a stationary loop, lying so that the longitudinal axis of the loop and the longitudinal axis of the well-logging tool are substantially aligned. Its dimensions are such as to obtain substantial inductive coupling with the transmitter as well as with the receiver of both XX and YY arrays. The long "box" calibrator of FIG. 4 is used to performed calibration of the horizontal arrays. A detailed analysis of the signals is given later in this document.

Figure 6:
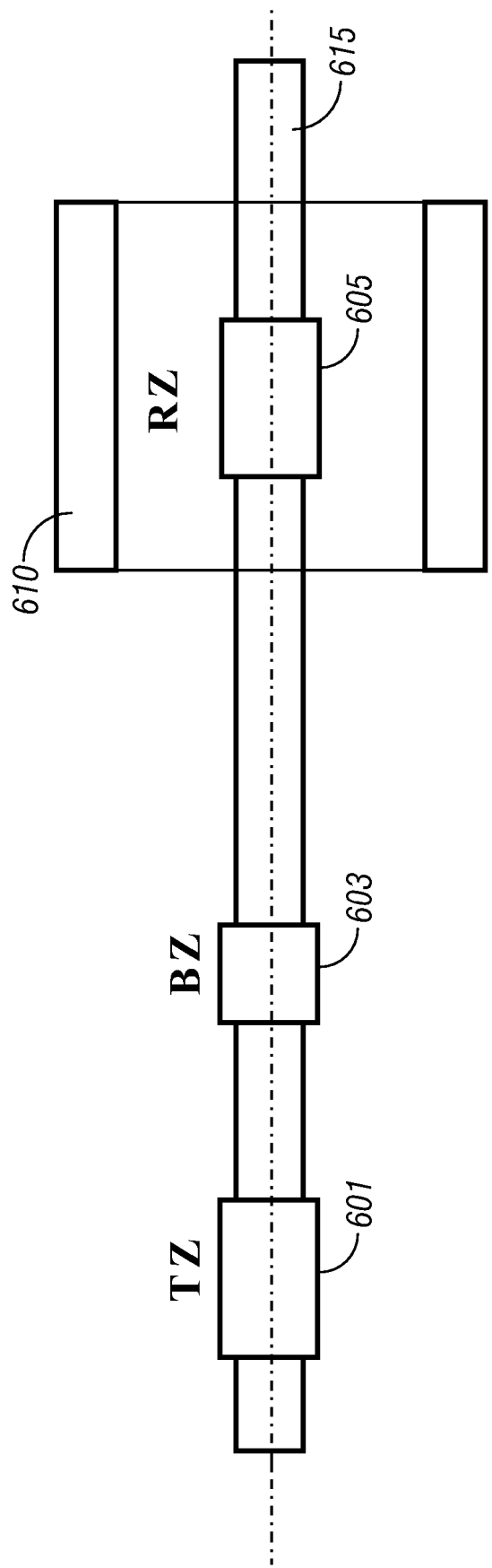
FIG. 6 illustrates an assembly for calibrating longitudinal arrays in a logging tool.

FIG. 6 illustrates a loop alignment assembly usable for aligning ZZ arrays in a testing device. Transmitter TZ 601, bucking coil BZ 603 and receiver RZ 605 are disposed along the feed-through pipe 615 and have a common longitudinal axis. Alignment loop 610 is substantially coaxial with receiver RZ 605 and substantially centered on RZ.

Figure 7:
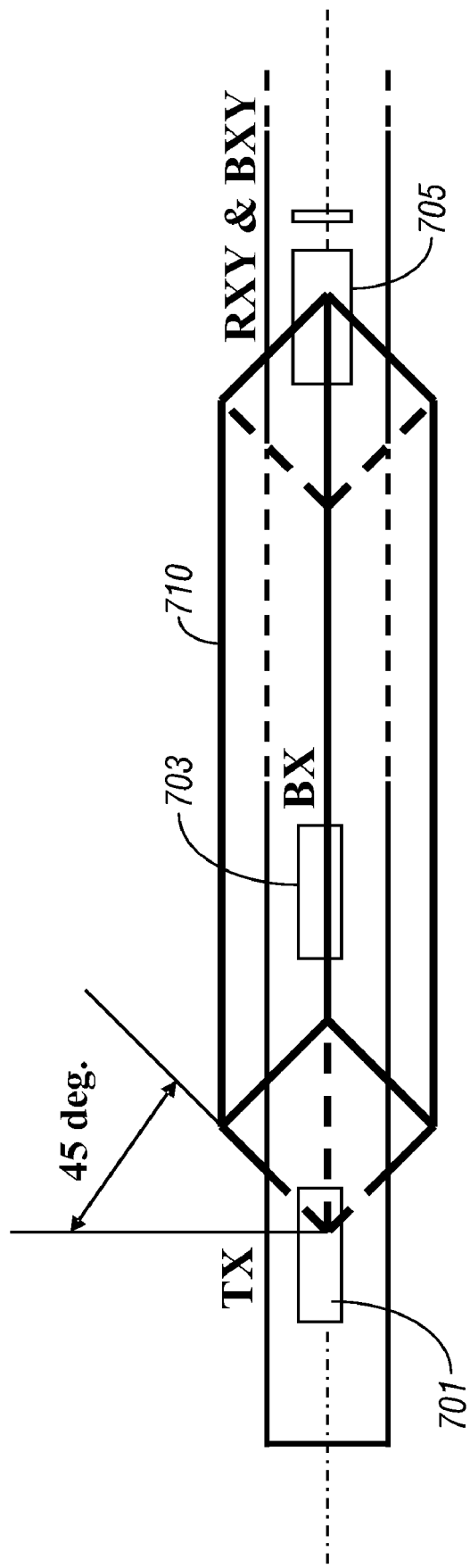
FIGS. 7-8 illustrate assemblies for calibrating XY cross-component arrays.

Cross component array calibration is discussed next. FIG. 7 illustrates an embodiment for calibration of an XY array using a calibration box. Transmitter 701 and bucking coil 703 are disposed along the feed-through pipe oriented to produce a magnetic moment in an X-direction. Receiver 705 is disposed along the same feed-through pipe having an orientation so as to receive components of a magnetic moment in a is disposed along the same feed-through pipe having an orientation so as to receive components of a magnetic moment in Y-direction. The alignment box 710 is disposed at an angle of 45° so as to be oriented halfway between the X-direction and the Y-direction.

Figure 8:
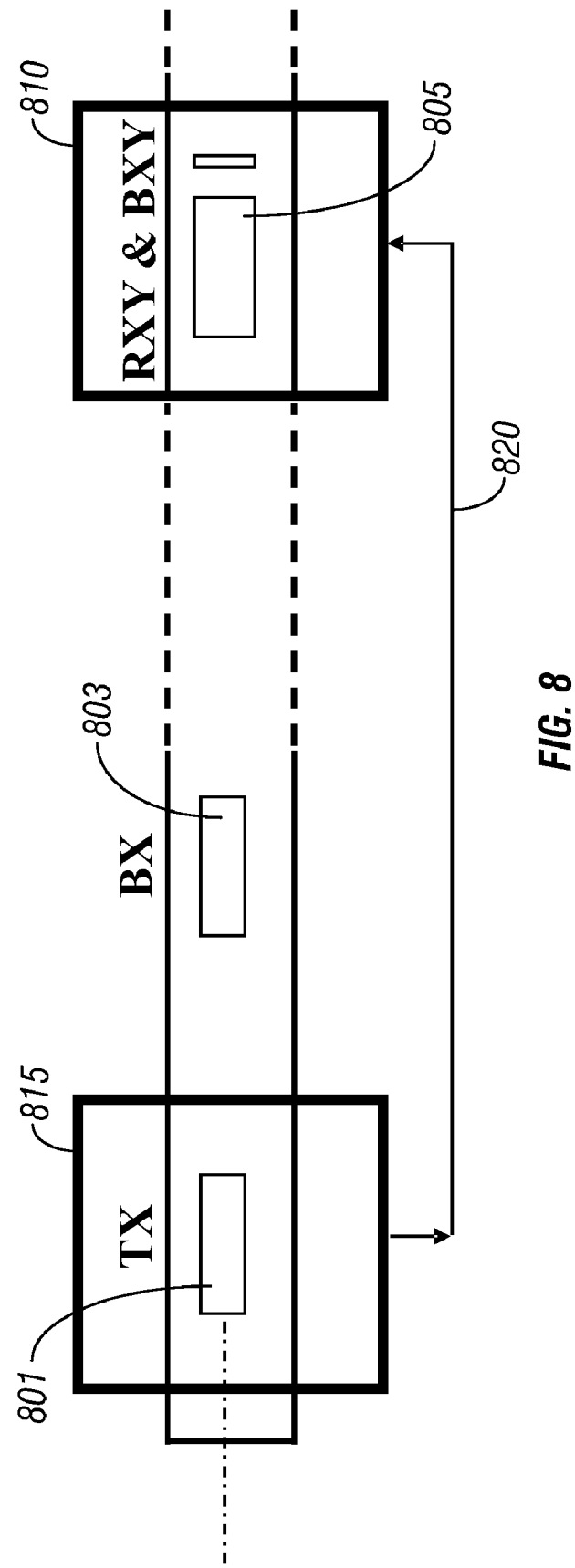

FIG. 8 illustrated an alternate embodiment for aligning an XY array. Alignment box 815 is located at the TX 801, and alignment box 810 is positioned at the RXY cross-component receiver 805. Both alignment boxes are oriented along the same direction as their respective transmitter/receiver. A wire 820 electrically couples alignment box 810 and alignment box 815.

Figure 9:
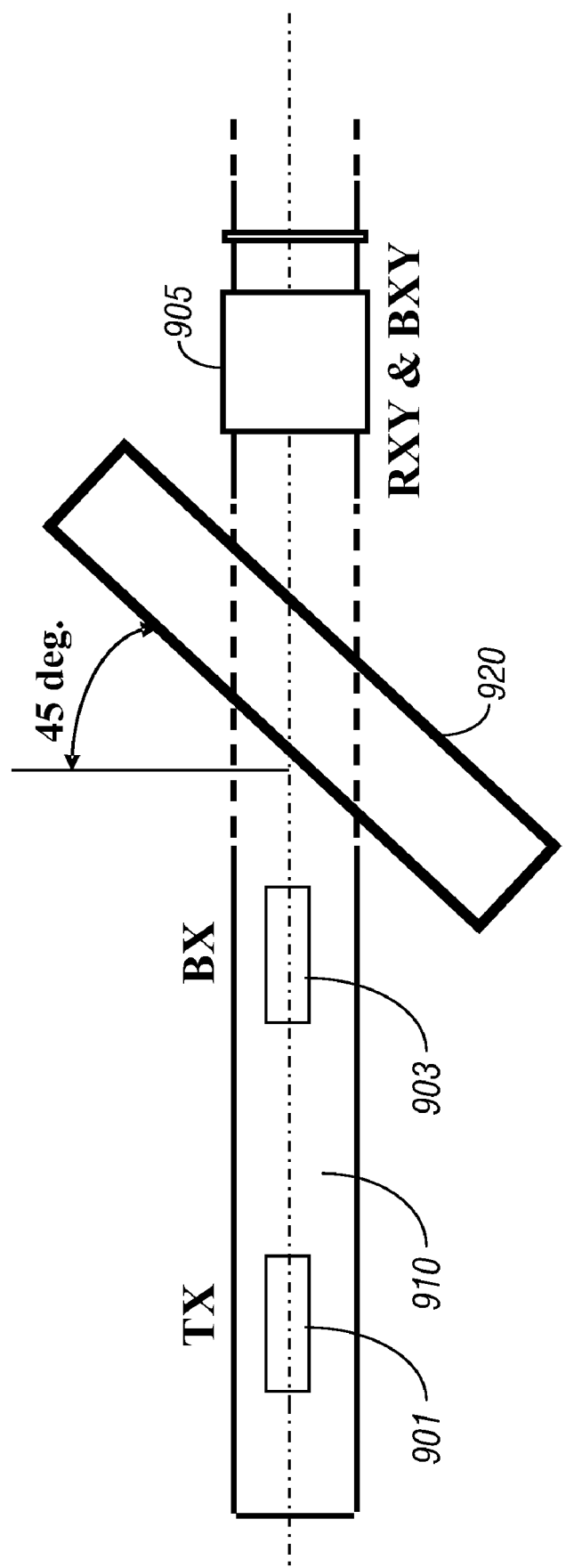
FIGS. 9-10 illustrate assemblies for calibrating XZ cross-component arrays.

FIG. 9 illustrates an assembly for orienting of the XZ cross-component array. Transmitter TX 901 and bucking coil BX 903 are disposed along the feed-through pipe oriented so as to produce a magnetic moment along an X-direction. The receiver RZ 905 is disposed along the feed-through pipe and oriented so as to be receptive to Z-components of magnetic moments. The alignment box 920 can be positioned centrally between main X-transmitter 901 and Z-cross-component receiver 905 and tilted 45° with respect to the tool longitudinal axis 910. The assembly of FIG. 8 displays small signals during XZ array calibration. This signal tends to display a high sensitivity to the angle.

Figure 10:
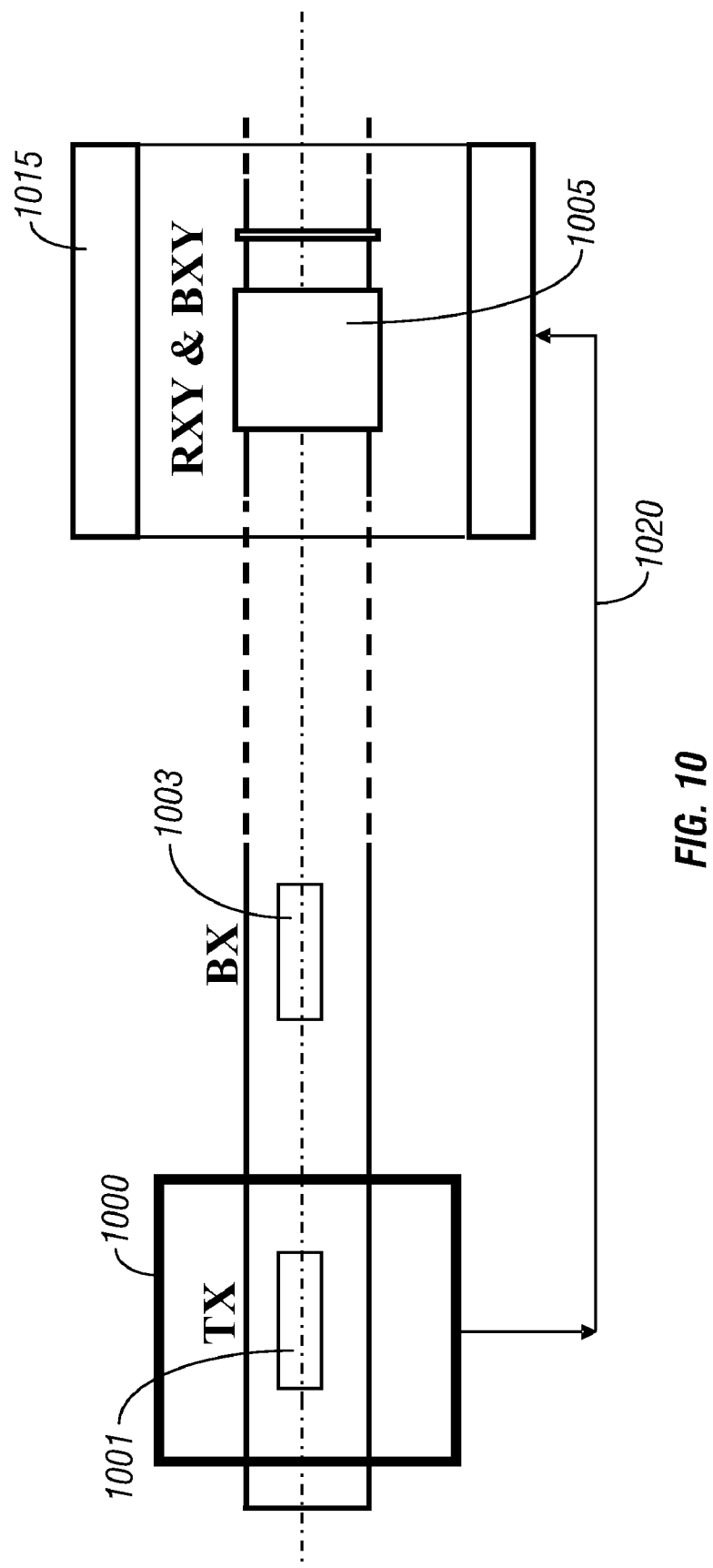

FIG. 10 illustrates an alternate embodiment for aligning the XZ cross-component array. Transmitter TX 1001 and bucking coil BX 1003 are disposed along the feed-through pipe oriented so as to produce a magnetic moment along an X-direction. The receiver RZ 1005 is disposed along the feed-through pipe and oriented so as to be receptive to Z-components of magnetic moments. Alignment box 1010 is centered on transmitter TX 1001, and alignment loop 1015 is coaxial with receiver RZ 1005. A wire 1020 electrically couples alignment box 1010 and alignment loop 1015. In contrast to the assembly of FIG. 10, calibration using two alignment devices displays a large signal for the XZ array calibration.

We next discuss in detail the use of the alignment box for establishing the coil orientation. When examining a cross-component array, the XY or YX response obtained by rotating the tool inside of the alignment loop has a zero-crossing each time that either a transmitter or a receiver coil is perpendicular to the plane of the loop. Whichever coil (transmitter or receiver) is substantially aligned with the loop (enclosed in the same plane) experiences a maximum coupling with the alignment loop. When the position of the aligned coil is varied around the point of alignment with the alignment loop, the coupling response between them undergoes a slow change corresponding to the variation. The non-aligned coil experiences a minimum coupling with the alignment loop. When the position of the non-aligned coil is varied around this point of minimal coupling, the coupling experiences an abrupt change. The coupling becomes zero when the non-aligned coil achieves perpendicularity with the alignment loop. A practitioner in the art would recognize that the zero-crossings of the coupling response are significantly affected by the coil that is at right angle to the alignment loop, regardless of whether the perpendicular coil is a receiver or a transmitter. The substantially aligned coil plays little or no role in the production of a zero-crossing. The angle between successive zero crossings thereby represents an alignment angle between the two related coils.

Mathematically, the inductive coupling between two coils resembles a cosine function of the angle between them. Thus, the coupling response system of coils made by an aligned system of cross components and an alignment loop is given by the following expression:

$$R(\phi) = K \cdot \cos(\phi) \cdot \cos\left(\phi - \frac{\pi}{2}\right). \tag{1}$$

Applying trigonometric identities, Eq. (1) can be simplified to $$R(\phi) = K \cdot \cos(\phi) \cdot \sin(\phi), \tag{2}$$

and since $$\sin(\phi) \cdot \cos(\phi) = \frac{1}{2}\sin(2 \cdot \phi), \tag{3}$$

it follows that $$R(\phi) = K \cdot \frac{1}{2} \cdot \sin(2 \cdot \phi). \tag{4}$$

Eqn. (4) illustrates that there are two cycles of variation for each cycle of tool rotation.

By considering a misalignment angle β between transmitter and receiver, the response function can now be expressed as $$R(\phi, \beta) = K \cdot \cos(\phi) \cdot \cos\left(\phi - \frac{\pi}{2} + \beta\right), \tag{5}$$

where each cosine function characterizes the response of the individual cross component coils. It is easy to see that $$R(\phi, \beta) = 0 \tag{6}$$

when $$\phi = n \cdot \frac{\pi}{2} \qquad \text{Eq. (7)}$$

or when $$\phi - \frac{\pi}{2} + \beta = n \cdot \frac{\pi}{2} \text{ with } n = \pm 1, 2, 3, \ldots$$

According to eqn. (7), the angle between successive zero-crossings represents the alignment angle among the cross component coils. An intuitive graphical approach can therefore be used to measure the misalignment angle between transmitter and receiver.

Alternatively, the misalignment angle can be obtained simply by using a trigonometric regression function to analyze the response of the system. Applying trigonometric identities to Eqn. (5), the response of the misaligned system can be written as $$R(\phi, \beta) = K \cdot \cos(\phi) \cdot \sin(\phi) \cdot \cos(\beta) + K \cdot \cos^2(\phi) \cdot \sin(\beta) \tag{8}$$

$$R(\phi, \beta) = K \cdot \frac{1}{2} \cdot \sin(2 \cdot \phi) \cdot \cos(\beta) + K \cdot \cos^2(\phi) \cdot \sin(\beta)$$

$$R(\phi, \beta) = \frac{K}{2} \cdot \sin(2 \cdot \phi + \beta) + \frac{K}{2} \cdot \sin(\beta)$$

The last expression in eqn. (8) indicates that a graphical representation of the coupling response of the misaligned cross component system resembles a sinusoidal function. The period of this sinusoid equals 180° and has offsets on both the abscissa and the ordinate. The offset on the abscissa is β, and the offset on the ordinate is (K/2)sin(β). Also, the coupling response is of the form A sin(x+B)+C, where A=K/2, B=β and C=(K/2)(sin(β). The coefficient B obtained with such fitting represents the misalignment angle. The cross component response can thus be fit to this curve. A similar procedure may be used for determining the misalignments of the other coils. It should be noted that It should be noted that the alignment procedure described above works equally well when the tool is rotated in a magnetic field having a known direction. In the specific example discussed above, the magnetic field is produced by activation of the transmitter coil. The misalignment angle of the receiver coil can be determined by rotating the tool in a magnetic field having a known direction and monitoring the signal in the receiver coil.

The sensitivity to possible displacement along the tool's longitudinal axis or vertically can be analyzed by changes in the product $M=M_{T-C}M_{C-R}$, where $M_{T-C}$ is the mutual inductance between the transmitter and the alignment coils, and $M_{R-C}$ is the mutual inductance between the alignment and the receiver coils. Table 1 illustrates mutual inductances that result from misalignment or displacement of an alignment coil in the horizontal direction (longitudinally). There is in general a flexibility of 1" without substantially affecting the induction response.

TABLE 1

| Calibrator Displacement [inch] | $M_{T-C}$ [microHenry] | $M_{C-R}$ [microHenry] | M [µH]$^2$ |
|---|---|---|---|
| 4 | 13.348 | 16.700 | 222.912 |
| 2 | 13.409 | 13.580 | 182.094 |
| 1 | 13.443 | 13.521 | 181.763 |
| 3/4 | 13.452 | 13.510 | 181.736 |
| 1/2 | 13.461 | 13.499 | 181.710 |
| 0 | 13.479 | 13.479 | 181.683 |
| −1/2 | 13.499 | 13.461 | 181.710 |
| −3/4 | 13.510 | 13.452 | 181.736 |
| −1 | 13.521 | 13.443 | 181.763 |
| −2 | 13.580 | 13.409 | 182.094 |
| −4 | 16.700 | 13.348 | 222.912 |

Table 2 shows the effects of misalignment in the vertical direction. A misalignment exceeding 5/16" produces an error greater than 0.22%. Thus vertical misalignment has a greater effect on induction response than horizontal misalignment.

TABLE 2

| Calibrator Displacement [inch] | $M_{T-C}$ [microHenry] | $M_{C-R}$ [microHenry] | M [µH]$^2$ | % |
|---|---|---|---|---|
| 0 | 13.479 | 13.479 | 181.683 | 0 |
| 3/16 | 13.474 | 13.474 | 181.549 | 0.074 |
| 5/16 | 13.464 | 13.464 | 181.279 | 0.22 |
| 7/16 | 13.449 | 13.449 | 180.876 | 0.44 |

To properly position the arrays, the transmitter coil of one array is moved in the direction normal to the ground. This coil movement is performed until an absolute minimum in the coupling response is determined. Upon adjustment, the transmitter coil frame is fixed inside the mandrel. After the first horizontal array has been tuned, the tool is rotated on its axis and a similar procedure is performed with the other horizontal array. Generally, similar tuning can be developed for an instrument having a plurality of transverse and tilted arrays. After balance of all arrays has been achieved, the tool isolation short is removed and mandrel is covered with the non-conductive pressure sleeve.

A final verification of the coil balancing and calibration consistency is made. Calibration of a transfer coefficient is performed once the instrument is inserted inside the calibrator in the low conductive calibration environment. A magnetic load is introduced suitable for calibrating array, so that its signal readings are identical to the values to be read while logging a homogeneous formation. The magnetic load is introduced using the above-referenced calibrator using known electromagnetic parameters and coupling parameters.

The tool loading can be achieved by connecting selected impedance to the terminal of a normally-open calibrator loop. Thus, the open loop represents an infinitely resistive formation. Once shorted, the closed loop represents an almost infinitely conductive formation (limited only by internal impedance of the wires of the calibrator loop). Therefore, a calibration loop load can be chosen effectively representing a given formation conductivity value.

Implicit in the control and processing of the data is the use of a computer program on a suitable machine readable medium that enables the processor to perform the control and processing. The machine readable medium may include ROMs, EPROMs, EPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

The following definitions are helpful in understanding the scope of the invention:

alignment: the proper positioning or state of adjustment of parts in relation to each other;
calibrate: to standardize by determining the deviation from a standard so as to ascertain the proper correction factors;
coil: one or more turns, possibly circular or cylindrical of a current-carrying conductor capable of producing a magnetic field;
EAROM: electrically alterable ROM;
EPROM: erasable programmable ROM;
flash memory: a nonvolatile memory that is rewritable;
machine readable medium: something on which information may be stored in a form that can be understood by a computer or a processor;
misalignment: the condition of being out of line or improperly adjusted;
Optical disk: a disc shaped medium in which optical methods are used for storing and retrieving information;
Position: an act of placing or arranging; the point or area occupied by a physical object
ROM: Read-only memory;

What is claimed is:

1. A method of preparing a logging tool having a plurality of antennas, the method comprising:
   positioning the antennas within a magnetic field above the surface of the earth;
   rotating the antennas relative to the magnetic field;
   activating a transmitter antenna that is included in the plurality of antennas at a plurality of rotational positions;
   receiving an induced signal in a receiver antenna that is included in the plurality of antennas at the plurality of rotational positions;
   estimating from the induced signal at the plurality of rotational positions an angle between the transmitter antenna and the receiver antenna;
   correcting an orientation of the transmitter antenna and the receiver antenna using the estimated angle; and deploying the logging tool into a borehole.

2. The method of claim 1 further comprising using a substantially planar alignment loop to provide the magnetic field.

3. The method of claim 1 further comprising orienting the loop in a substantially horizontal position.

4. The method of claim 1 wherein the transmitter antenna and the receiver antenna are nominally orthogonal to the longitudinal axis of the tool.

5. The method of claim 4 wherein determining the angle further comprises using a relation of the form:

$$R(\phi,\beta)=K\cdot\cos(\phi)\cdot\cos(\phi+\beta)$$

where K is a gain factor, $\phi$ is an angle between one of the antenna and a plane defined by the loop, and $\beta$ is an angle between the transmitter and receiver antennas.

6. The method of claim 1 wherein determining the angle further comprises estimating a rotational position at which the signal is substantially zero.

7. The method of claim 1 further comprising correcting an alignment of at least one of (i) the transmitter antenna, and (ii) the receiver antenna, using the estimated angle.

8. The method of claim 1 wherein a transmitter antenna is nominally orthogonal to a receiver antenna.

* * * * *

UNITED STATES PATENT AND TRADEMARK OFFICE
CERTIFICATE OF CORRECTION

PATENT NO. : 7,652,478 B2  Page 1 of 1
APPLICATION NO. : 11/621282
DATED : January 26, 2010
INVENTOR(S) : Luis M. Pelegri It is certified that error appears in the above-identified patent and that said Letters Patent is hereby corrected as shown below:

Column 14, claim 3, line 62, delete "claim 1", insert --claim 2--;

Column 15, claim 5, line 1, delete "determining", insert --estimating--;

Column 15, claim 5, line 6, delete "the loop", insert --a loop--;

Column 15, claim 6, line 8, delete "determining", insert --estimating--;

Column 16, claim 8, line 6, delete "a receiver", insert --the receiver--.

Signed and Sealed this

Twenty-third Day of March, 2010

David J. Kappos
*Director of the United States Patent and Trademark Office*